United States Patent [19]

Wagoner et al.

[11] Patent Number: 5,738,523

[45] Date of Patent: Apr. 14, 1998

[54] WRITTEN COMPOSITION TEACHING METHODS AND AIDS THEREFOR

[76] Inventors: Susan Lentz Wagoner, 11620 Ayreshire Rd.; Judy Cottam Rhodes, 10305 Hickory Forest Dr., both of Oakton, Va. 22124

[21] Appl. No.: 650,786

[22] Filed: May 20, 1996

[51] Int. Cl.⁶ ............................................. G09B 1/34
[52] U.S. Cl. ........................ 434/170; 434/172; 434/156
[58] Field of Search ...................................... 434/156, 165, 434/167, 170, 171, 172, 403, 428

[56] References Cited

U.S. PATENT DOCUMENTS

| | | | |
|---|---|---|---|
| 3,235,976 | 2/1966 | Elliot et al. | 434/170 |
| 3,333,351 | 8/1967 | Williams | 434/171 |
| 3,482,333 | 12/1969 | Trager | 434/170 |
| 3,728,800 | 4/1973 | Magram | 434/171 |
| 4,044,476 | 8/1977 | Marsh | 434/171 |
| 4,445,869 | 5/1984 | Wasserman | 434/156 |
| 4,613,309 | 9/1986 | McCloskey | 434/170 |
| 4,907,971 | 3/1990 | Tucker . | |
| 5,013,245 | 5/1991 | Benedict . | |
| 5,453,014 | 9/1995 | Hendriks . | |
| 5,522,243 | 6/1996 | Kusmiss | 70/330 |

*Primary Examiner*—Robert A. Hafer
*Assistant Examiner*—Laura Fossum
*Attorney, Agent, or Firm*—Nixon & Vanderhye

[57] ABSTRACT

An educational method for teaching written composition is demonstrated within a series of hand-held, rectangular manipulatives encoded with raised, colored indicia. Representing a foundation from which all types of writing may be explored, the manipulatives have been so designed that continuity of theme and flow of composition is ensured. Each rectangular manipulative symbolizes a paragraph in written composition. Colored bands framing the manipulatives identify paragraph themes and subsequent order within a composition. The raised, color-coded indicia represent key sentences within a paragraph and is so ordered as to clearly outline proper sentence sequencing. The manipulatives, used individually or interactively, provide a focus for critical elements of successful writing through enjoyable visual and tactile stimulation. Traditional writing concepts and language structure rules are reinforced and solidified in an objective, non-threatening manner. This innovative educational method has cross-curricula applications and may be taught to groups or personally tailored to address the specific needs of individuals. Freedom of expression, individual writing style and creativity are provided within the theory and application of this invention.

14 Claims, 6 Drawing Sheets

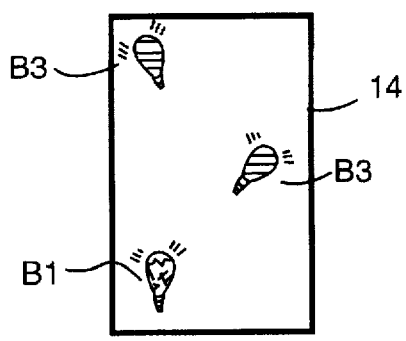 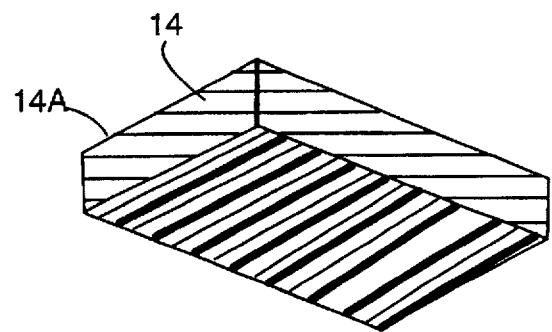
FIG. 7A  FIG. 7B
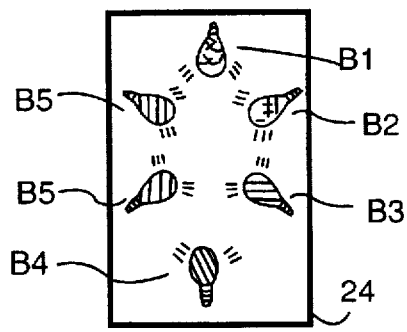 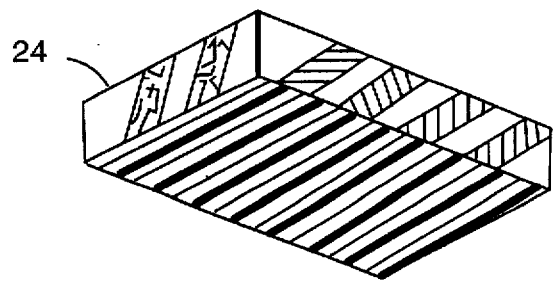
FIG. 8A  FIG. 8B

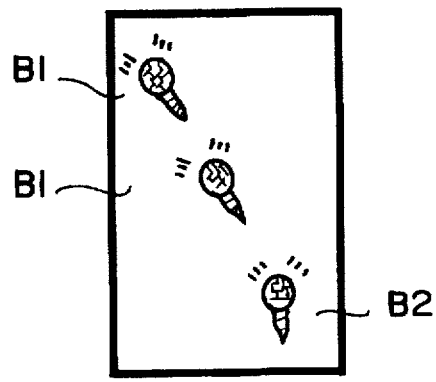
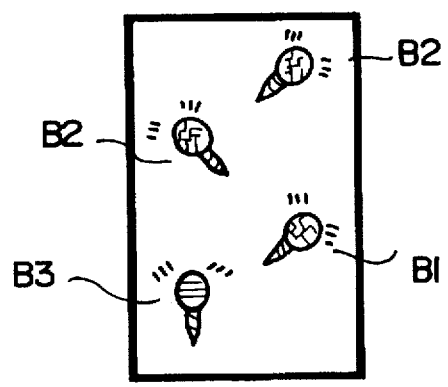
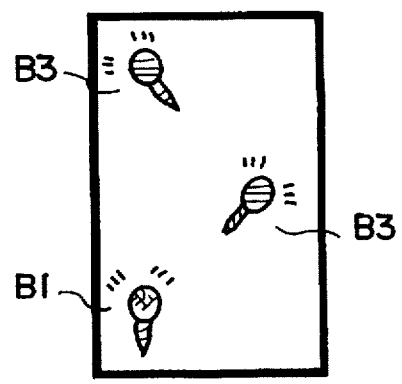
FIG. 9

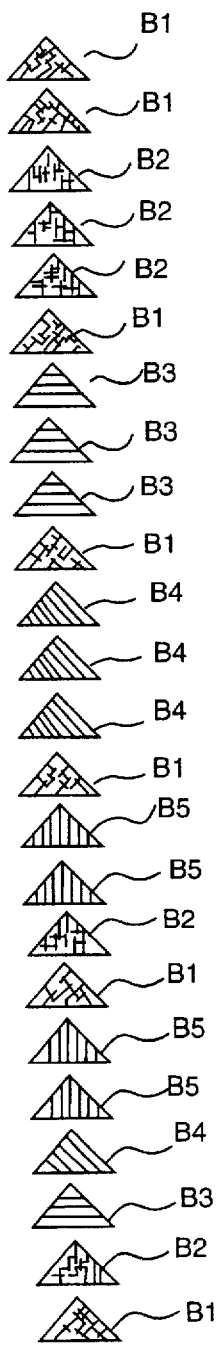
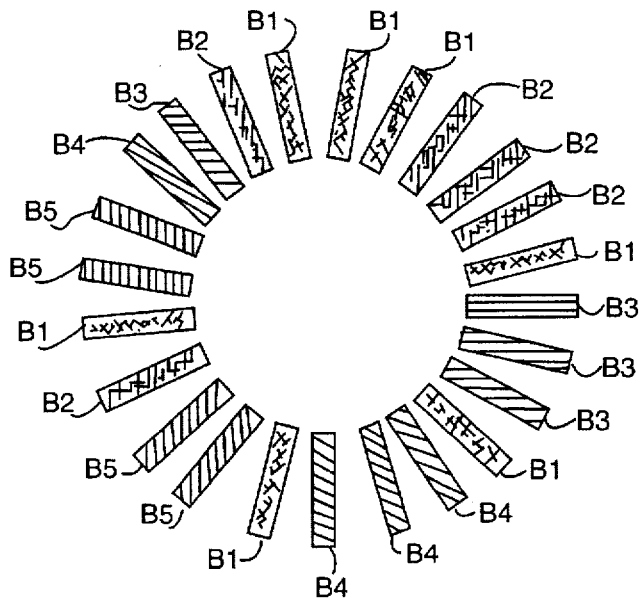
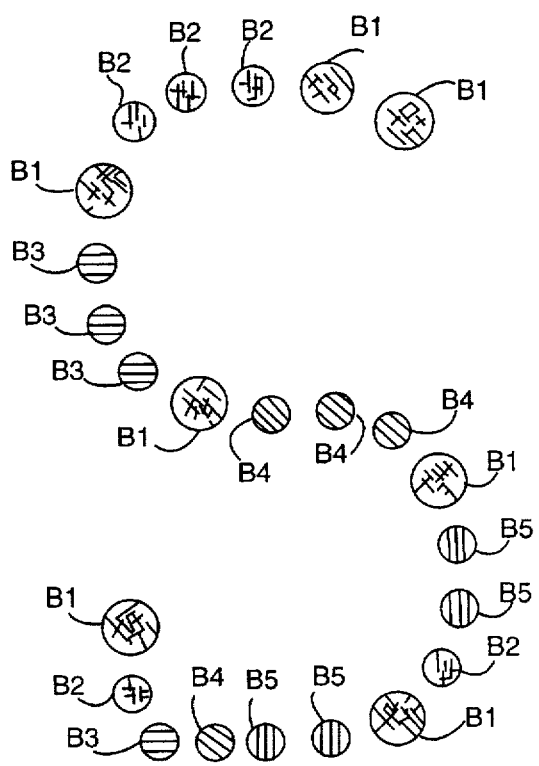
FIG. 11
FIG. 12
FIG. 13

WRITTEN COMPOSITION TEACHING METHODS AND AIDS THEREFOR

BACKGROUND

The present invention relates to innovative methods for teaching written composition, wherein the methods can be used to teach general writing skills by utilizing a series of color-coded articles or manipulatives symbolically delineating proper sentence and paragraph sequence.

The inability to write coherent paragraphs and subsequent story is prevalent among young and inexperienced writers. As writing has been traditionally taught via oral presentations and textual examples, followed by a teacher's subjective analysis and evaluation, students approach writing with trepidation, as no definitive guidelines exist.

Students hesitate to write because they are unsure of the specific delineation of the composition structure. There is no objective focus or foundation from which to build or assess written communication. This lack of direction stifles the individual voice of creativity. Therefore, innovative, written composition teaching methods and teachings aids therefor are desirable.

Especially desirable are written composition methods and aids in support of those methods which would respectively teach and facilitate the teaching of general writing skills by identifying key themes used in writing, e.g., Who, What, Where, When, Why, and Why/How, and demonstrating those relationships through a clear outline of sentence and paragraph interaction. It is also desirable to provide objective teaching methods which promote individual expression and decreases the fear of writing for students of any age or educational level. It is additionally desirable to provide methods that offer versatility in addressing the individual needs of both students and instructors, applicable to any writing style, transcending curricular boundaries.

Language arts instruction would welcome a safe and enjoyable educational tool that utilizes both the senses of sight and touch en route to mastering effective written speech. Language arts instruction would welcome a tool that serves as a guideline for composition assessment. One that objectively captures traditional writing concepts and language structure rules in a hands-on presentation that is easily handled and quickly distributed among group or individual users of any language is especially desirable.

Educational methods which utilize interactive, colored, language art manipulatives are known in the prior art. The issue of general categories of structurally different shapes representing all the parts of speech of natural human language is described in U.S. Pat. No. 5,453,014 to Helga M. L. Hendricks. U.S. Pat. No. 4,907,971 by Ruth L. Tucker describes a method which syntactically categorizes the components of English language sentences and a schema for showing categories for which any sentence could belong. Morgan D. Benedict, in U.S. Pat. No. 5,013,245, describes a system which depicts a series of interconnecting geometric shapes to represent parts of speech comprising simple sentence patterns.

The known prior art is grounded in rudimentary language structure and is severely limited in its scope. To applicants' knowledge, no method and aids therefor exist which address the stage of writing development between language acquisition and mastery of advanced written composition. Similarly to our knowledge, no educational methods and aids therefor exist which teach comprehensive written composition skills.

DISCLOSURE OF THE INVENTION

A principal object of the present invention is to provide educational methods and aids therefor for teaching written composition skills to students of any age or educational level.

Another object of the present invention is to identify key themes used in successful writing and provide a clear outline of sentence and paragraph interaction within composition.

A further object of the present invention is to capture traditional writing concepts and language structure rules in a concrete foundation.

Another object of the present invention is to provide a focus from which all types of writing styles may be explored across curricular and cultural boundaries.

Another object of the present invention is to provide an objective guideline to be used for written composition development and assessment, promoting faster learning, individual expression and decreased fear of writing.

Another object of the present invention is to offer versatility in manipulative usage, thus addressing individual needs of both students and instructors.

Another object of the present invention is to provide an educational article or manipulative that integrates the senses of sight and touch.

Another object of the present invention is to provide an easily-handled, quickly-distributed educational article; or manipulative that is safe and enjoyable.

A further object of the present invention is to provide an educational article or manipulative which is of simple, inexpensive construction.

In accordance with a preferred form of the present invention, there is provided a written composition teaching method characterized by a series of hand-held articles or manipulatives encoded with colored indicia. Each of the articles or manipulatives per se represents a paragraph for the written composition with each article having first indicia representing a particular theme for that paragraph. Each article also includes second indicia which, in a preferred form, comprises color-coded bas-relief indicators such as light bulbs. Each light bulb is preferably color-coded with second indicia to indicate sentence themes within the paragraph theme represented by that article. The bases of the light bulbs also provide a visual link between the sentences represented by the bulbs on each block, i.e., the bases may point toward the next bulb and hence the next sentence theme for that paragraph, which can be the same theme or a different theme. The last bulb on a block preferably makes a necessary situational and visual link to the first bulb of a next block and which next block represents a new paragraph and different theme. The second block similarly has first indicia representing another main paragraph theme and has coded light bulbs representing sentence themes within that paragraph, the light bulbs again providing visual direction sentence by sentence within the paragraph to the sentence themes represented thereby. Additional blocks are provided with different paragraph themes and sentence themes. Thus, the articles with the first and second indicia identify key themes in paragraphs and sentence structure within paragraphs in appropriate sequential order, focussing on sentence and paragraph interaction within a composition.

In a preferred embodiment according to the present invention, there is provided a teaching aid for writing a composition having a plurality of paragraphs and sentences within those paragraphs arranged in a selected order of writing themes comprising a plurality of discrete articles each representing a paragraph of the written composition, first indicia on the articles representing respective different paragraph themes, second indicia on each article representing different sentence themes, the second indicia being arranged on each article in an order corresponding to at least part of the selected order of writing themes and including beginning and ending second indicium representing beginning and ending sentence themes, respectively, for the paragraph represented by the article, the ending indicium on each article representing an ending sentence theme corresponding to a beginning sentence theme of a beginning sentence of a next subsequent paragraph of the written composition, the beginning indicium of another article representing the ending theme thereby enabling, by matching with one another ending and beginning ones of the second indicia of the articles having corresponding sentence themes, an arrangement of the articles in the selected order of writing themes for the composition.

In a further preferred embodiment according to the present invention, there is provided a teaching aid for writing a composition having a plurality of paragraphs and sentences within those paragraphs arranged in a selected order of writing themes comprising first and second discrete articles representing different paragraphs of a written composition, indicia on each article representing paragraph and sentence themes, one of the indicia on the first article representing a theme common to a first paragraph of the written composition and a sentence of the first paragraph, and another of the indicia on the first article representing a subsequent theme for a last sentence; of the first paragraph different from the common theme, one indicia and another indicia being arranged on the first article in an order corresponding to at least part of the selected order of writing themes, one of the indicia on the second article representing the subsequent theme, the subsequent theme being common to a second paragraph of the written composition and a sentence of the second paragraph, and another indicia on the second article representing a further theme for a last sentence of the second paragraph different from or the same as one of the subsequent and common themes, one indicia and another indicia on the second article being arranged thereon in an order corresponding to at least another part of the selected order of writing themes, thereby enabling, by matching with one another, another indicia of the first article and the one indicia of the second article, an arrangement of the articles in a predetermined order according to the selected order of writing themes for the composition.

In a still further preferred embodiment according to the present invention, there is provided a method for teaching written composition wherein the composition has a plurality of paragraphs and sentences within those paragraphs arranged in a selected order of writing themes comprising the steps of providing a plurality of articles each visually representing a paragraph of the written composition, representing respective different paragraph themes by providing first indicia on the articles, representing different sentence themes by providing second indicia on each article, arranging the second indicia on each article in an order corresponding to at least part of the selected order of writing themes, representing beginning and ending sentence themes for each paragraph of the written composition by including beginning and ending second indicium, respectively, on each article and transitionally linking paragraphs arranged in the selected order of writing themes by corresponding the ending indicium on an article representing an ending sentence theme with the beginning indicium on another article wherein the beginning indicium on another article represents a beginning sentence theme of a beginning sentence of a next subsequent paragraph of the written composition.

In a still further preferred embodiment according to the present invention, there is provided a method for teaching written composition wherein the composition has a plurality of paragraphs and sentences within those paragraphs arranged in a selected order of writing themes comprising the steps of providing a plurality of articles in an array thereof each visually representing a sentence of the written composition, representing different sentence themes by providing respective indicia on the articles, arranging the articles in an order corresponding to at least part of the selected order of writing themes including forming groups of the articles in the array respectively representing different paragraph themes, representing beginning and ending sentence themes for each paragraph of the written composition by selecting articles having the indicia representing predetermined beginning and ending sentence themes respectively in each group of articles and transitionally linking paragraphs arranged in the selected order of writing themes by corresponding the ending indicium on a selected article representing an ending sentence theme with the beginning indicium on another selected article wherein the beginning indicium on another selected article represents a beginning sentence theme of a beginning sentence of a next subsequent paragraph of the written composition.

BRIEF DESCRIPTION OF THE DRAWINGS

FIG. 7A is a top plan view of an "Alternate" writing block in accordance with the theory and application of the present invention;

FIG. 7B is a right side, front and bottom perspective view of the block in FIG. 7A;

FIG. 8A is a top plan view of a "Summary" writing block in accordance with the theory and application of the present invention;

FIG. 8B is a right side, front and bottom perspective view of the block in FIG. 8A;

FIG. 9 is a top plan view of sequentially arranged "Who," "What" and alternate "Where" theme blocks in accordance with the theory and application of the present invention;

FIG. 11 is a top plan view of articles representing various writing themes arranged in a linear format in accordance with the theory and application of the present invention;

FIG. 12 is a top plan view of articles representing various writing themes arranged in a circular format in accordance with the theory and application of the present invention; and FIG. 13 is a top plan view of articles representing various writing themes arranged in a generally S-shaped configuration in accordance with the theory and application of the present invention.

BEST MODE FOR CARRYING OUT THE INVENTION

In accordance with the theory and application of the present invention, an educational method for teaching written composition skills is demonstrated within a series of eight rectangular articles or manipulatives, preferably formed of molded plastic material. With raised, color-coded indicia, also preferably formed of molded plastic material, key themes used in successful writing are identified. Tile educational method integrates the senses of sight (color, number, placement) and touch (size, direction) en route to providing a clear outline of sentence and paragraph interaction within a composition. It will be appreciated that the articles or manipulatives (hereafter in this specification sometimes called articles, blocks, or manipulatives) may be formed of other materials, such as wood, metal, cardboard or paper, and may be of different shapes than as herein illustrated.

Each manipulative or article represents a paragraph in written composition and has first indicia representing a paragraph theme. Second indicia on the manipulative represent sentences and sentence themes within a paragraph.

Traditional writing concepts and language structure rules are captured in this concrete foundation. For example, the writing concept of "a paragraph needs two or more sentences" is demonstrated in the number of second indicia, for example, light bulbs on each article which may be in the form of a rectilinear block. Additionally, sentence and paragraph linkage is demonstrated by the color codes and bulb/block positioning. For instance, paragraph theme linkage within a composition is demonstrated with colored bulbs appearing on each block at its opposite ends and with directions indicating a next sentence theme or paragraph theme. Additionally, main theme linkage within a composition is demonstrated, e.g., by at least one like-colored bulb on each block.

Provided within the educational method is an objective guideline to be used for written composition development and assessment. Versatility of manipulative usage addresses the individual needs of both students and instructors.

Should a student need help with the writing of a particular theme, a specific block may be used singly. In addition, short composition skills may be taught and refined within a three-block configuration. The order, flow and reflection of a three-paragraph composition is illustrated in FIG. 9. This will become apparent from the ensuing description of the articles representing a six-paragraph composition.

Figure 10:
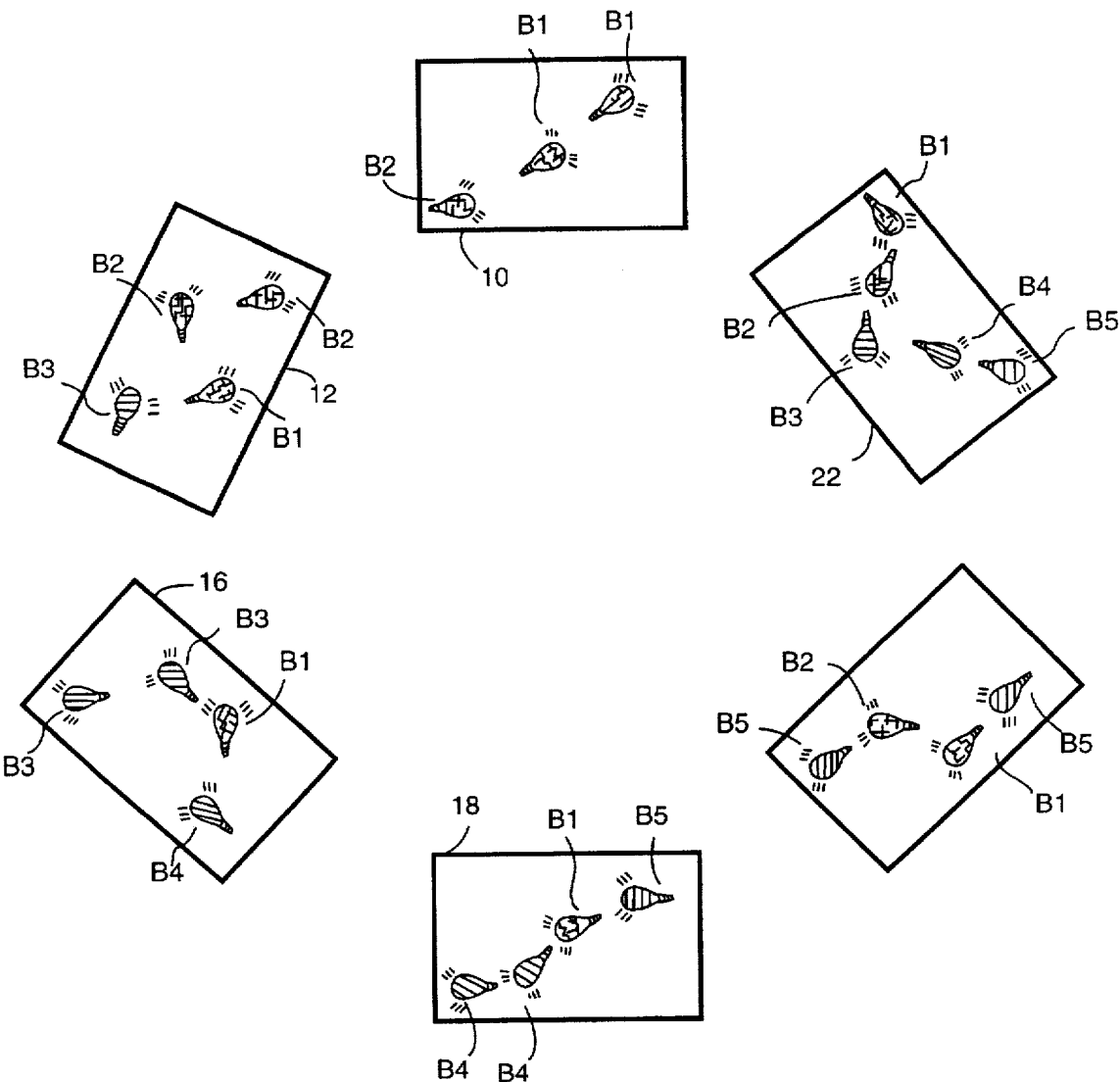
FIG. 10 is a top plan view of sequentially arranged "Who," "What," "Where," "When," "Why" and "Why/How" theme blocks in accordance with the theory and application of the present invention.

For longer compositions, all six blocks are used to exemplify a fully-balanced theme presentation. The order, flow and reflection of a six-paragraph composition is illustrated in FIG. 10 in a circular arrangement of the articles described in detail below.

A focus from which all types of writing styles may be explored is provided in this educational method. Instructors can apply the method across curriculum and cultures. The method affords simple, inexpensive construction, is easily handled and quickly distributed. Faster learning, individual expression and a decreased fear of writing is promoted in this safe and enjoyable educational method.

Figure 1A:
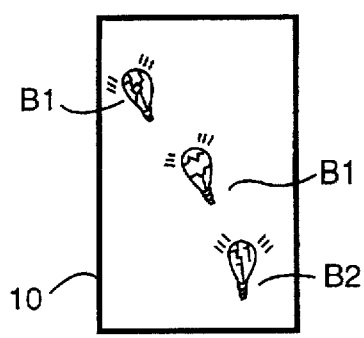
FIG. 1A is a top plan view of a "Who" main theme writing block in accordance with the theory and application of the present invention.

In a specific embodiment of the present invention, FIG. 1A illustrates a manipulative 10, e.g., a block which per se represents a first paragraph of the written composition. Block 10 also includes first indicia representing a paragraph theme, e.g., a "Who" theme. The first indicia may comprise a color coding on the block, e.g., providing block 10 in a solid single color 10A. It will be appreciated that types of first indicia other than solid single colors may be used, e.g., colored striping, various types of bas-reliefs, or any other indicia sufficient to distinguish one block from another.

FIG. 1A further includes second indicia, e.g., three bas-relief, colored light bulbs B1, B1 and B2. These represent three respective sentences of "Who," "who" and "What" themes within a paragraph. It will be appreciated that types of second indicia other than light bulbs may be utilized, e.g., apples. Note also that the first indicia 10A of the main paragraph theme represented thereby on block 10 by the solid color coding corresponds in color to the "Who" sentence themes B1, B1 on block 10 and particularly to the first bulb on block 10.

Figure 1B:
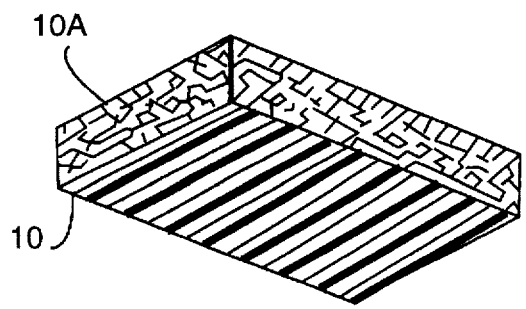
FIG. 1B is a right side, front and bottom perspective view of the block in FIG. 1A.

Located on the "Who" main theme block 10, which theme is symbolized by the solid colored first indicia 10A shown in FIG. 1B, one or more additional bulbs are arranged at different levels or locations therealong with the colored screw bases serving as third indicia pointing the direction of sentence order and linkage between sentences. Thus, the first "Who" theme bulb B1 has a base which points to the second "Who" theme bulb B1. The latter has a base which points to a "What" theme bulb B2 at the opposite end of block 10.

In a preferred embodiment, this arrangement could represent a first paragraph of a composition entitled "Cowgirl Jill."

(B1-Who) Jill is a cowgirl. (B1-Who) Jill is a nine-year old who has a pony. (B2-What) Her pony is a spice-colored pinto, named Cinnamon.

Figure 2A:
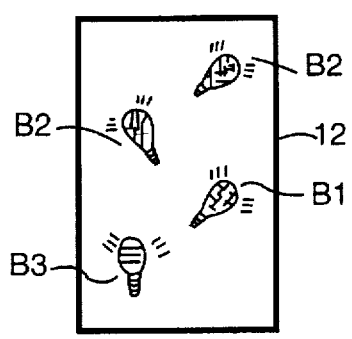
FIG. 2A is a top plan view of a "What" main theme writing block in accordance with the theory and application of the present invention.
Figure 2B:
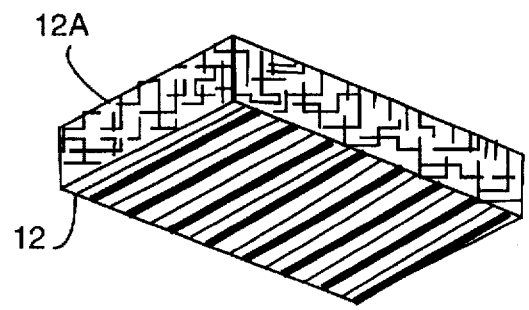
FIG. 2B is a right side, front and bottom perspective view of the block of FIG. 2A.

When used in conjunction with other writing blocks, the last bulb B2 on the "Who" theme block 10 makes the necessary situational and visual link to the first bulb B2 of the subsequent theme block 12 of FIGS. 2A and 2B. Block 12 thus per se represents the second paragraph of the composition, carries first indicia representing a paragraph theme, e.g., a "What" theme and has four bas-relief, colored light bulbs B2, B2, B1 and B3 representing, e.g., four respective sentences of "What," "What," "Who" and "Where."

Located on the "What" main theme block 12, as symbolized by the solid colored first indicia 12A (a different color than first indicia 10A on block 10) shown in FIG. 2B, the bulbs B2, B2, B1 and B3 are arranged at different levels or locations with the colored screw bases pointing the direction of sentence order and linkage. When used in conjunction with other writing blocks, the last bulb B3 makes the necessary situational and visual link to the first bulb B3 on either of two subsequent theme blocks.

In a preferred embodiment, this arrangement could represent the second paragraph of the above composition.

(B2-What) Jill loves her pony. (B2-What) Cinnamon is gentle and comes to her when called. (B1-Who) Jill often brings the pony carrots. (B3-Where) She meets Cinnamon by the fence and feeds her directly into her mouth.

For three-paragraph composition, the alternate theme block 14 illustrated in FIG. 7A may be used. Block 14 per se represents the third paragraph, carries first indicia (solid colored first indicia 14A) representing a paragraph theme, e.g., "Where" and has three bas-relief, colored light bulbs B3, B3 and B1. These bulbs represent three respective sentences of "Where," "Where" and "Who."

Located on the "Where" alternate theme block 14, as symbolized by the solid colored first indicia 14A shown in FIG. 7B, the bulbs B3, B3 and B1 are arranged at different levels or locations with the colored screw bases pointing the direction of sentence order and linkage. When used in conjunction with other writing blocks, the last bulb B1 makes the necessary situational and visual link to the first bulb B1 of the "Who" main theme block 10.

In a preferred embodiment, this arrangement could represent the final paragraph of the above composition.

(B3-Where) The barnyard is a perfect spot for walking Cinnamon. (B3-Where) The area outside the fence is where they go running. (B1-Who) Jill likes to go riding.

Figure 3A:
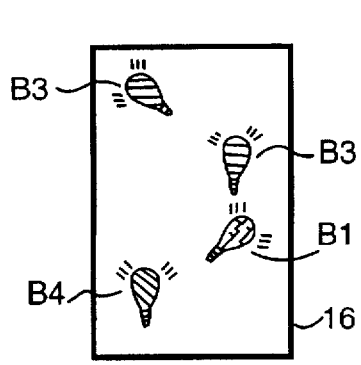
FIG. 3A is a top plan view of a "Where" subordinate theme writing block in accordance with the theory and application of the present invention.

For six-paragraph composition, the block 16 illustrated in FIG. 3A may be used in conjunction with blocks 10 and 12. Thus, the last bulb B3 of block 12 makes the necessary situational and visual link to the first bulb B3 of the subsequent theme block 16 of FIGS. 3A and 3B. Block 16 per se represents the third paragraph of the composition, carries first indicia 16A representing a paragraph theme for that block, e.g., "Where" and has four bas-relief, colored light bulbs B3, B3, B1 and B4. These bulbs represent four respective theme sentences of "Where," "Where," "Who" and "When."

Figure 3B:
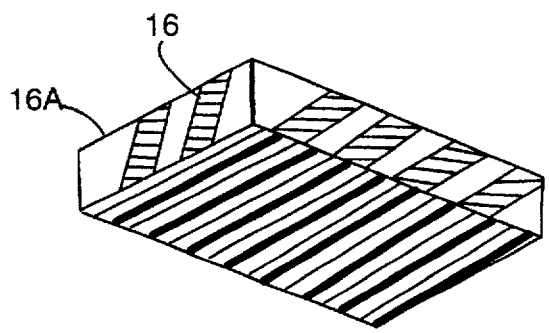
FIG. 3B is a right side, front and bottom perspective view of the block in FIG. 3A.

Located on the "Where" subordinate theme block, as symbolized by the diagonally-striped first indicia 16A shown in FIG. 3B, the bulbs B3, B3, B1 and B4 are arranged at different levels or locations therealong, with the colored screw bases pointing the direction of sentence order and linkage.

In a preferred embodiment, this arrangement could represent the third paragraph of the continuing above composition.

(B3-Where) The barnyard is a perfect spot for walking Cinnamon. (B3-Where) The area outside the fence is where they go running. (B1-Who) Jill likes to go riding. (B4-When) All day long the two of them go.

Figure 4A:
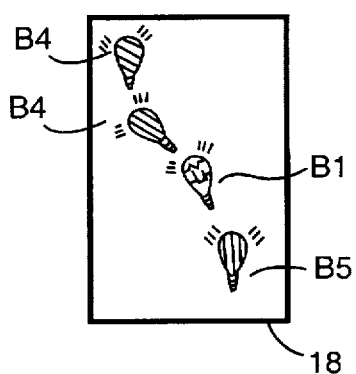
FIG. 4A is a top plan view of a "When" subordinate theme writing block in accordance with the theory and application of the present invention.
Figure 4B:
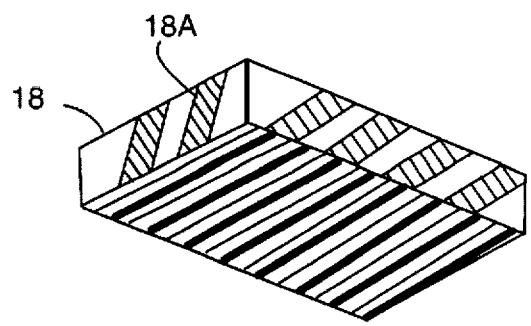
FIG. 4B is a right side, front and bottom perspective of the block in FIG. 4A.

When used in conjunction with other writing blocks, the last bulb B4 of block 16 makes the necessary situational and visual link to the first bulb B4 of subsequent theme block 18 of FIGS. 4A and 4B. Block 18 per se represents the fourth paragraph, carries first indicia (striped colored indicia 18A) representing a paragraph theme, e.g., "When" and has four bas-relief, colored light bulbs B4, B4, B1 and B5. These represent four respective theme sentences of "When," "When," "Who" and "Why."

Located on the "When" subordinate theme block 18, as symbolized by the diagonally-striped colored first indicia 18A (a different color than all other paragraph theme colors) shown in FIG. 4B, the bulbs are arranged at different levels or locations therealong with the colored screw bases pointing the direction of sentence order and linkage.

In a preferred embodiment, this arrangement could represent the fourth paragraph of the above composition.

(B4-When) The minute Jill wakes up, she is at the barn getting ready for their outing. (B4-When) She spends the morning feeding and grooming Cinnamon. (B1-Who) Her father told her that a healthy pony is a happy pony. (B5-Why) Jill knows that if her pony feels good, her pony will want to run.

Figure 5A:
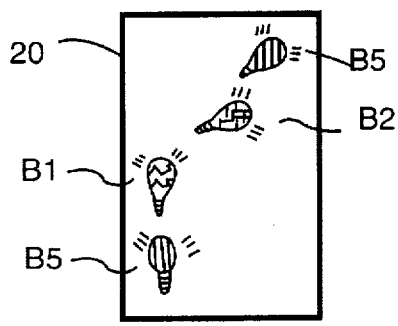
FIG. 5A is a top plan view of a "Why" subordinate theme writing block in accordance with the theory and application of the present invention.
Figure 5B:
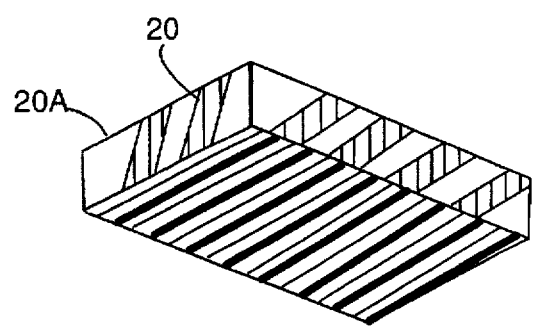
FIG. 5B is a right side, front and bottom perspective of the block in FIG. 5A.

When used in conjunction with other writing blocks, the last bulb B5 of block 18 makes the necessary situational and visual link to the first bulb B5 of a subsequent theme block 20 of FIGS. 5A and 5B. Block 20 thus represents the fifth paragraph, carries first indicia (striped color indicia 20A) representing a paragraph theme, e.g., "Why," and has four bas-relief, colored light bulbs B5, B2, B1 and B5. These bulbs represent four respective theme sentences of "Why," "What," "Who" and "Why."

Located on the "Why" subordinate theme block 20, as symbolized by the diagonally-colored band shown in FIG. 5B, the bulbs are arranged at different levels or locations therealong with the colored screw bases pointing the direction of sentence order and linkage.

In a preferred embodiment, this arrangement could represent the fifth paragraph of the above composition.

(B5-Why) Cinnamon prefers running to walking. (B2-What) Every time Jill gets in the saddle, the pony speeds up her pace automatically. (B1-Who) Jill hangs on tightly and giggles. (B5-Why) She feels safe with her spirited pinto.

Figure 6A:
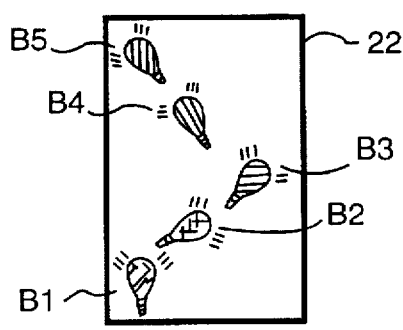
FIG. 6A is a top plan view of a "Why/How" subordinate theme writing block in accordance with the theory and application of the present invention.
Figure 6B:
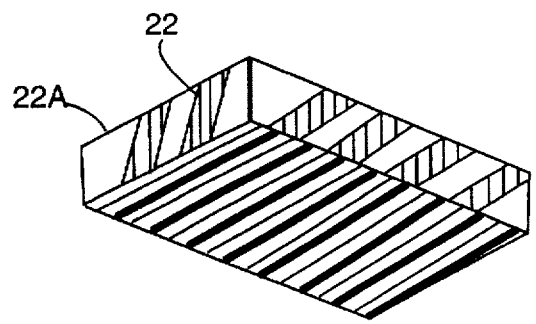
FIG. 6B is a right side, front and bottom perspective view of the block in FIG. 6A.

When block 20 is used in conjunction with other writing blocks, the last bulb B5 makes the necessary situational and visual link to the first bulb B5 of a subsequent theme block 22 of FIGS 6A and 6B. Block 22 thus per se represents the sixth paragraph, carries first indicia (striped colored indicia 22A) representing a paragraph theme, e.g., "Why/How" and has five bas-relief, colored light bulbs B5, B4, B3, B2 and B1. These represent five respective theme sentences of "Why," "When," "Where," "What" and "Who."

Located on the "Why/How" subordinate theme block 22, as symbolized by the diagonally striped colored first indicia 22A shown in FIG. 6B (e.g., a different color than all other colors representing paragraph themes or the same color as the color of the preceding "Why" theme block 20), the bulbs are arranged at different levels or locations therealong with the colored screw bases pointing the direction of sentence order and linkage. When used in conjunction with other writing blocks, the last bulb B1 makes the necessary situational and visual link to the first bulb B1 of the "Who" main theme block 10.

In a preferred embodiment, this arrangement could represent the sixth, final paragraph of the above composition.

(B1-Why) Jill knows Cinnamon. (B4-When) From the moment her pony was born, Jill spent all her free time around the barn. (B3-Where) She would sit in Cinnamon's stall. (B2-What) She talked to her pony and took care of all of Cinnamon's needs. (B1-Who) Jill is Cinnamon's best friend.

FIG. 8A illustrates a "Summary" block 24, as symbolized by the diagonally-striped, multi-colored first indicia shown in FIG. 8B. Block 24 has six bas-relief, colored light bulbs B1, B2, B3, B4, B5 and B6. These represent six respective theme sentences of "Who," "What," "Where," "When," "Why" and "Why/How." The bulbs are arranged at different levels with the colored screw bases pointed outward. All components necessary for a summarization are represented.

In a preferred embodiment, this arrangement could represent a summarization of any story, for example, "The Wizard of Oz."

(B1-Who) There was this young girl named Dorothy who lived with her aunt and uncle in Kansas. (B2-What) Dorothy didn't like living there, so she took her dog, Toto, and ran away from home. (B3-Where) She traveled in a tornado to a colorful place called Oz where she made friends with a Scarecrow, a Tinman and a Cowardly Lion. (B4-When) While she was there, the Wizard told her to kill the Wicked Witch of the West and he would grant her wishes. (B5-Why) Because she loved her friends, she asked for their gifts first. (B5-Why) She got her wish to go back to Kansas by clicking her heels three times and saying, "There's no place like home!"

Referring now to FIGS. 11–13, the theory and application of the present invention can be represented in forms other than the block form represented by the prior embodiment. For example, in FIG. 11, there is illustrated a linear array of articles or manipulatives for presenting the selected order of writing themes for the paragraphs and sentences of the composition. Similarly, FIGS. 12 and 13 present the articles or manipulatives in a different arrangement but which nonetheless present the articles in a form representing the selected order of writing themes for the composition. As evident from a review of FIGS. 11–13, paragraph delineations between the articles representative of the selected sentence themes have been omitted. As students progress in learning composition, they need less structure and, consequently, the linear, circular, S-shaped and other forms of arrays of articles may be used without paragraph delineation because the student, having used the articles illustrated in FIGS. 1–10, will have learned the paragraph structure rules or guidelines to be used in the composition through recognition of the various second indicia on the articles. For example, where two or more articles representing like themes appear in succession, the student will be alerted to possible paragraph separation.

From a review of FIGS. 11–13 and a comparison with FIGS. 1–10, it will be appreciated that the articles of FIGS. 11, 12 and 13 are in the same order of the written composition as the composition using the blocks or articles of FIGS. 1A–6A. For example, in the linear array of FIG. 11, each triangle is provided in a color. Thus, the first two triangularly-shaped articles represent a "Who" theme, similarly as block 10 shown in FIG. 1A, followed by a triangle having second indicia representing a "What" theme, similarly as the ending indicium B2 of block 10. Recognizing the theme of the first paragraph as "Who," the student will recognize that the next triangularly-shaped article representing B2, i.e., the fourth triangle from the top in FIG. 11, constitutes the beginning indicium of a new paragraph having a corresponding theme. As the writer progresses to the seventh triangularly-shaped article, the writer will recognize the theme "Where" by the second indicia of that article and will know that the third paragraph should follow, beginning with the eighth triangularly-shaped article B3, representing the "Where" theme. The linear progression along the triangles is continued similarly as the progression among the light bulbs on the sequentially ordered blocks of FIGS. 1A–6A. The triangles indicate, of course, the direction of the progression or sequence of the themes from top to bottom.

Similarly in FIG. 12, a circular arrangement of articles is provided. Thus, the student will start with the article B1 representing the "Who" theme at the 1 o'clock position of the circular array and continue clockwise around the array of articles, identifying the sentence themes represented by each article and through prior knowledge of the articles illustrated in FIGS. 1A–6A, recognizing the main paragraph themes and hence appropriate paragraph delineation. Similarly in FIG. 12, the articles have been arranged generally in an S-shaped configuration. Starting at the top of the S-shaped array, the articles are arranged in sequence similarly as the sequences of light bulbs in FIGS. 1A–6A, as well as the articles of FIGS. 11 and 12. Various sizes of the articles can be disposed in each of the arrays to delineate main themes of the paragraphs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for teaching written composition wherein the composition has a plurality of paragraphs and sentences within those paragraphs arranged in a selected order of writing themes comprising the steps of:

providing a plurality of articles each representing a paragraph of the written composition;

providing first indicia on said articles, indicating said first indicia as representing respective different paragraph themes;

providing second indicia on each article, indicating said second indicia as representing different sentence themes;

providing said second indicia on each article in a predetermined order, indicating said order of said second indicia as corresponding to at least part of the selected order of writing themes;

providing beginning and ending second indicium on each article, indicating said beginning and ending second indicium as representing beginning and ending sentence themes, respectively, for the paragraph of the written composition represented by said article; and arranging the articles so that said ending indicium on an article representing an ending sentence theme is matched with said beginning indicium on another article wherein said beginning indicium on said another article represents a beginning sentence theme of a beginning sentence of a next subsequent paragraph of the written composition whereby paragraphs are linked in the selected order of writing themes.

2. A method according to claim 1 including, for at least one article, matching said beginning indicium representing a beginning sentence theme with a first indicia on said one article representing the paragraph theme whereby the beginning sentence theme and paragraph for said one article match one another.

3. A method according to claim 1 including providing said second indicia on each said article representing a discrete sentence for a paragraph of the written composition represented by said article.

4. A method according to claim 1 including providing third indicium on each article, indicating said third indicium as representing sentence order within the paragraph represented by said article by identifying the next subsequent one of said second indicia on said article.

5. A method according to claim 1 including forming an array of articles in the selected order of writing themes by arranging the articles with ending and beginning second indicia on said articles adjacent one another.

6. A method according to claim 1 including providing color coded said first indicia on respective articles to identify said paragraph themes within the composition.

7. A method according to claim 1 including providing color coded said second indicia on each article to identify sentence themes within the paragraph represented by said article.

8. A method according to claim 1 including identifying sentence themes within the paragraph represented by said article by providing said second indicia on each article in bas-relief.

9. A method according to claim 1 including indicating said first indicia representing a paragraph theme for an article as matching a beginning indicium within said article representing a beginning sentence theme thereby matching the paragraph beginning indicium themes for said article.

10. A method for teaching written composition wherein the composition has a plurality of paragraphs and sentences within those paragraphs arranged in a selected order of writing themes comprising the steps of:

providing a plurality of articles in an array thereof, indicating said articles as each visually representing a sentence of the written composition;

providing respective indicia on said articles, indicating said indicia as representing different sentence themes;

arranging said articles in an order corresponding to at least part of the selected order of writing themes including forming groups of the articles in the array respectively representing different paragraph themes;

selecting articles in each group thereof having said indicia representing beginning and ending sentence themes respectively for each paragraph; and arranging the articles so that ending indicium on a selected article representing an ending sentence theme is matched with said beginning indicium on another selected article wherein said beginning indicium on said another selected article represents a beginning sentence theme of a beginning sentence of a next subsequent paragraph of the written composition whereby paragraphs are linked in the selected order of writing themes.

11. A teaching aid for writing a composition having a plurality of paragraphs and sentences within those paragraphs arranged in a selected order of writing themes comprising:

a plurality of discrete articles each representing a paragraph of the written composition;

first means on said articles for representing respective different paragraph themes;

second means on each article for representing different sentence themes, said second means being arranged on each article in an order matching at least part of the selected order of writing themes and including beginning means and ending means for representing beginning and ending sentence themes, respectively, for the paragraph represented by said article;

said ending means on each article for representing an ending sentence theme matching a beginning means on another article for representing a beginning sentence theme of a beginning sentence of a next subsequent paragraph of the written composition, thereby enabling, by matching with one another said ending means and said beginning means of said second means of said articles having matching sentence themes, an arrangement of the articles in the selected order of writing themes for the composition.

12. A teaching aid according to claim 11 wherein each said second means on each article represents a discrete sentence for a paragraph of the written composition represented by said article; and third means on each article identifying a next subsequent one of said second means on said article for providing a direction for sentence order within the paragraph represented by said article.

13. A teaching aid according to claim 11 wherein said beginning means on each article represents a beginning sentence theme corresponding to the paragraph theme represented by said article.

14. A teaching aid according to claim 11 wherein said ending means are positioned on said articles at locations corresponding to the positions of said beginning means on next subsequent articles to identify the order of the articles when arranged in the selected order of writing themes.

* * * * *